UNITED STATES PATENT OFFICE 2,366,494

SYNTHETIC COMPOSITIONS OBTAINED BY REACTION OF A CHLORINATED ACETAMIDE WITH A BENZYL SULPHONAMIDE-MODIFIED UREA RESIN

Gaetano F. D'Alelio, Pittsfield, Mass., assignor to General Electric Company, a corporation of New York No Drawing. Application January 28, 1941, Serial No. 376,329

5 Claims. (Cl. 260—70)

This invention relates broadly to the production of new and valuable synthetic compositions and more particularly is concerned with compositions of matter comprising a condensation product of ingredients comprising essentially (1) an aldehyde, e. g., formaldehyde or other active methylene-containing body such as dimethylol urea, trimethylol melamine, etc., and (2) an active aralkylsulphonamide, more particularly an aralkylsulphonamide having at least one hydrogen atom attached directly to the sulphonamide nitrogen. An example of an aralkylsulphonamide is benzyl sulphonamide,

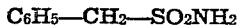

which should not be confused with compounds such as benzene sulphonamide, $C_6H_5-SO_2NH_2$, benzene disulphonamide, $C_6H_4(SO_2NH_2)_2$, toluene sulphonamide, $H_3C-C_6H_4-SO_2NH_2$, etc. Specifically the present invention relates to compositions comprising the product of reaction of (1) a partial condensation product of ingredients comprising urea, formaldehyde and benzyl sulphonamide with (2) a curing reactant comprising a chlorinated acetamide.

It was known prior to my invention that resinous compositions could be obtained by condensing an aldehyde with arylsulphonamides and their N-monoalkyl substitution products. It also was known that resinous materials capable of being hardened could be produced by condensing an aldehyde with a sulphonamide of a cyclic organic compound that has attached to the ring structure at least one substituted or unsubstituted $-SO_2NH_2$ group and, also, another group comprising a substituted or unsubstituted $-NH_2$ group, at least one of such groups being unsubstituted.

The present invention resulted from my discovery that synthetic materials of particular utility in the plastics and coating arts, as hereafter more fully described, and of outstanding heat-stability characteristics are obtained when ingredients comprising (1) an aldehyde, e. g., formaldehyde or other active methylene-containing body, and (2) an active aralkylsulphonamide, more particularly benzyl sulphonamide, are caused to react together.

The aralkylsulphonamides may be described more particularly as aryl-substituted aliphatic sulphonamides wherein the aryl substituent is a mono- or poly-aryl substituent, the aliphatic chain is a straight-chain, saturated aliphatic chain and the sulphonamide grouping has at least one hydrogen atom attached directly to the nitrogen atom thereof. For example, one, two or three of the valencies of the alpha carbon atom may be satisfied by the radical of a mono- or poly-aryl compound. Preferably I use an active aralkylsulphonamide wherein one and only one of the valencies of the aryl-substituted carbon atom is satisfied by the radical of a mono-aryl compound and two of the remaining valencies are satisfied by hydrogen, specifically benzyl sulphonamide. Active aralkylsulphonamides wherein the aryl-substituted carbon atom has attached thereto only one aryl substituent also may be described as aryl compounds having a single aliphatic side chain wherein at least one substituent as, for instance, the terminal substituent, is a sulphonamide radical having at least one hydrogen atom attached directly to the sulphonamide nitrogen.

The active aralkylsulphonamides may be described more specifically as sulphonamides having the graphic formula

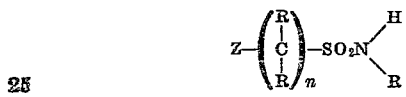

where $n$ is an integer and is at least 1, R represents hydrogen or any monovalent organic radical and Z represents any mono- or poly-aryl (mono- or poly-carbocyclic) nucleus. Thus, R may be either hydrogen or a monovalent organic radical such, for example, as alkyl (e. g., methyl, ethyl, propyl, butyl, amyl, etc.), aryl (e. g., phenyl, etc.), alkaryl (e. g., alkphenyl, etc.), aralkyl (e. g., phenmethyl, phenethyl, etc.), acyl, naphthyl, hydrocyclic, heterocyclic, etc., or nitro, halogeno, aceto, carbalkoky, acetoxy, amido, imido, sulphamyl, sulphimido, amino, imino, nitrilo, etc., derivatives of such radicals. Z may be, for instance, any substituted or unsubstituted mono- or poly-aryl nucleus, for example radicals such as phenyl, halogeno-aryl (e. g., halogeno-phenyl), nitro-aryl (e. g., nitro-phenyl), alkylated aryl (e. g., alkylated phenyl), hydroxylated aryl (e. g., hydroxy phenyl), alkoxy aryl (e. g., alkoxy phenyl), aryloxy aryl (e. g., phenoxy phenyl), acetoxy aryl (e. g., acetoxy phenyl), carbalkoxy aryl (e. g., carbalkoxy phenyl), aryl phenyl (e. g., diphenyl), aminoaryl (e. g., aminophenyl), amidoaryl (e. g., amidophenyl), sulphamylaryl (e. g., sulphamylphenyl), sulphmidoaryl (e. g., sulphimidophenyl), naphthyl, etc. From this it will be seen that Z in the above formula is the nucleus of an aryl compound having attached to the ring structure the above-described radical $-(CR_2)_xSO_2NHR$ and that the remaining positions in the ring structure may be satisfied by hydrogen or by a monovalent substituent. The substituent groupings in the ring structure may be the same or different and they may be present in any number up to the combining power of the particular aryl nucleus.

Although the condensation products of an aldehyde, e. g., formaldehyde or other active methylene-containing body, and an active aralkylsulphonamide, more particularly benzyl sulphonamide, are valuable in themselves (e. g., as modifiers, specifically plasticizers, of other synthetic resins, in the production of coating compositions and thermoplastic molding materials, etc.), especially valuable products are obtained when the condensation reaction between the aldehyde and the aralkylsulphonamide is carried out in the presence of other substances capable of reacting with aldehydes. Examples of such substances in the presence of which the reaction may be carried out are phenols, alcohols (monohydric and polyhydric), e. g., butyl alcohol, polyvinyl alcohol, etc., nitriles (e. g., methacrylonitrile), proteins (e. g., casein), amido (including imido) and amino (including imino) compounds, e. g., amino (amidogen) diazines, amino triazines and the N-substitution and C-substitution products of such compounds, urea, thiourea and iminourea and substituted ureas, thioureas and iminoureas, benzene and toluene mono-, di- and tri-sulphonamides, etc., also suitable mixtures thereof. The condensation products of an aralkylsulphonamide with an aldehyde also may be separately prepared and suitably incorporated into separately prepared resinous condensation products of the above-mentioned organic compounds (phenols, amidogen compounds, etc.) with an aldehyde, e. g., formaldehyde or other active methylene-containing body such as dimethylol urea, trimethylol melamine, etc., thereby to obtain valuable mixed resinous condensation products.

In order that those skilled in the art better may understand how the present invention may be carried into effect, the following illustrative examples are given. All parts are by weight.

*Example 1*

| | Mols |
|---|---|
| Benzyl sulphonamide | 1 |
| Formaldehyde (in the form of an aqueous solution containing about 37.1% HCHO) | 1 |

The above components were heated under reflux at the boiling temperature of the mass for 3 hours. The resulting syrup was dehydrated, yielding a clear, colorless, brittle, thermoplastic resin.

*Example 2*

A reaction product of (1) benzyl sulphonamide and (2) a partial condensation product of 1 mol urea and 2 mols formaldehyde was obtained by heating together under reflux at boiling temperature, for 30 minutes, 1 part by weight benzyl sulphonamide with 44.5 parts of the partial condensation product of (2), which partial condensation product was a syrupy mass containing about 45% resin solids. This reaction product may be described as a potentially reactive urea-formaldehyde-benzyl sulphonamide intercondensation product. Addition of direct or active curing catalysts (e. g., phthalic anhydride, citric acid, etc.) or of latent curing catalysts (e. g., sodium chloracetate, diethyl chloracetamide, ethyl glycine ester hydrochloride, etc.) or intercondensation with curing reactants (e. g., mono-, di- and trichloracetamides, chloracetonitrile, aminoacetamide hydrochloride, aminoacetonitrile hydrochloride, ethylene diamine monohydrochloride, diethanol amine hydrochloride, nitrourea, chloracetyl urea, glycine, chloracetone, etc.) causes the potentially reactive (heat-convertible) resinous syrup rapidly to convert to an insoluble, infusible state when subjected to an elevated temperature, e. g., 100° to 200° C.

Other examples of active and latent curing catalysts and of curing reactants that may be employed to accelerate or to effect curing of the soluble, fusible intercondensation product are given in various copending applications of mine, for instance in copending application Serial No. 346,962, filed July 23, 1940, now Patent No. 2,325,375, and Serial No. 354,395, filed August 27, 1940, now Patent No. 2,325,376, both of which applications issued on July 27, 1943, and are assigned to the same assignee as the present invention.

Compositions similarly prepared in the absence of the benzyl sulphonamide show less satisfactory flow or plasticity characteristics.

*Example 3*

| | Parts |
|---|---|
| Potentially reactive urea-formaldehyde-benzyl sulphonamide intercondensation product of Example 2 | 44.5 |
| Curing reactant, specifically chloracetamide (mono-chloracetamide) | 0.1 |

The above components were heated under reflux at the boiling temperature of the mass for 10 minutes to cause the chloracetamide to intercondense with the urea-formaldehyde-benzyl sulphonamide partial condensation product. The resulting hot resinous syrup was mixed with 13.3 parts alpha cellulose in flock form and 0.2 part zinc stearate to form a molding (moldable) compound. The wet compound was dried until sufficiently freed of moisture for proper molding. The dried compound was molded at 135° C. for 5 minutes under a pressure of 2,000 pounds per square inch. The molded articles were well cured throughout and showed evidence of better knitting and much better plastic flow during molding than articles similarly prepared from a resinous reaction product of chloracetamide with a urea-formaldehyde partial condensation product containing no intercondensed benzyl sulphonamide.

*Example 4*

| | Parts |
|---|---|
| Potentially reactive liquid condensation product of 1 mol urea and 2 mols formaldehyde, containing about 45% solids | 44.5 |
| Benzyl sulphonamide-formaldehyde resin of Example 1 | 1.1 |
| Curing reactant, specifically chloracetamide | 0.1 |

The same procedure was followed in making the resin syrup, molding composition and molded articles as described under Example 3. The molded pieces were well cured throughout. When the benzyl sulphonamide-formaldehyde resin is omitted from the formulation, products are obtained that show less satisfactory flow and knitting characteristics during molding. The benzyl sulphonamide-formaldehyde resin is stable during the molding operation, is compatible with the urea-formaldehyde condensation product and does not "bleed" from the molding compound or from the molded article.

Example 5

Benzyl sulphonamide was caused to react with a partial condensation product of melamine and formaldehyde (and of urea, melamine and formaldehyde) to yield potentially reactive resinous compositions that could be cured to an insoluble, infusible state as described under Example 2.

Example 6

Same as Example 3 with the exception that a potentially reactive intercondensation product of melamine, formaldehyde and benzyl sulphonamide was employed instead of a urea-formaldehyde - benzyl sulphonamide intercondensation product. Well-cured molded articles that showed good plastic flow during molding were obtained.

Example 7

Same as Example 3 with the exception that a potentially reactive intercondensation product of urea, melamine, formaldehyde and benzyl sulphonamide was used in place of the urea-formaldehyde - benzyl sulphonamide intercondensation product. The molded pieces were well cured throughout and had excellent flow characteristics during molding.

Example 8

Same as Example 4 with the exception that a potentially reactive liquid condensation product of melamine and formaldehyde was used in place of the urea-formaldehyde partial condensation product. Well-cured molded articles that showed excellent plastic flow during molding were obtained from molding compositions comprising the mixed resinous composition.

Example 9

Same as Example 4 with the exception that a potentially reactive liquid condensation product of urea, melamine and formaldehyde was employed instead of the potentially reactive liquid condensation product of urea and formaldehyde. The molded pieces were well cured throughout and showed evidence of excellent flow and knitting characteristics during molding.

The condensation reaction between the aralkylsulphonamide and the aldehyde, e. g., formaldehyde or other active methylene-containing body, may be carried out under acid, neutral or alkaline conditions, at normal or at elevated temperatures and at atmospheric, sub-atmospheric or super-atmospheric pressure. Preferably, the reaction is initiated under neutral or alkaline conditions. Neutral conditions may be established by neutralizing, if necessary, either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter, if desired, the solution may be treated to eliminate acidic conditions due to acid or acid salts. That is, the mass may be neutralized or be made alkaline by adding an alkaline substance.

In obtaining the neutral, alkaline or acid conditions I may use, for example, ammonia, sodium hydroxide or carbonate, calcium hydroxide, methyl amine, diethyl amine, tri-isopropyl amine, ethanol amines, tri-isopropanol amine, etc.; mixtures of such alkaline substances, inorganic or organic acids such as hydrochloric, sulphuric, phosphoric, acetic, acrylic, crotonic, malonic, etc., or acid salts such as sodium acid sulphate, monosodium phosphate, etc., or mixtures of acids, of acid salts, or of acids and acid salts.

Particularly good results are obtained when the condensation reaction between the aralkylsulphonamide and the aldehyde, e. g., formaldehyde or other active methylene-containing body, is carried out in the presence of other substances capable of reacting with aldehydes, methylol ureas (methylol derivatives of a urea), methylol derivatives of aminotriazines (amidogentriazines) or other active methylene-containing bodies, numerous examples of which substances have been given hereinbefore. In such inter-condensation or co-condensation products the aralkylsulphonamide internally plasticizes the product, yielding resinous materials of improved plasticity characteristics as compared with compositions similarly made in the absence of the aralkylsulphonamide. This was quite surprising and unexpected, since in no way could it have been predicted from the known properties of aralkylsulphonamides that it would function to improve the plasticity characteristics of such co-condensation products. Since the aralkylsulphonamide becomes an integral part of the resin molecule, an internally plasticized resin of remarkable stability is obtained as the aralkylsulphonamide cannot "bleed" from the resin under heat. "Bleeding" of the plasticizer from a plasticized resin often occurs when conventional plasticizers are used that do not interact with the other components of the resin but are present merely in the form of a physical admixture with the resin.

Various ways may be employed in forming such inter-condensation products. (For ease of description an amidogen compound, e. g., urea, thiourea, iminourea, substituted ureas, thioureas and iminoureas, aminotriazines, etc., is mentioned specifically as the third component which is caused to react with the aldehyde while admixed with the aralkylsulphonamide.) For example, I may first mix all the reactants and effect condensation between the mixed reactants in the presence or absence of addition agents, as for instance, condensation catalysts, fillers, plasticizers, other natural or synthetic resinous bodies, solvents or diluents, etc. Alternatively, I may add the aralkylsulphonamide to a partial condensation product of an amidogen compound and an aldehyde and effect further condensation between the components. In producing such a partial condensation product I prefer to cause the condensation reaction between the amidogen compound and the aldehyde to take place in the presence of a primary condensation catalyst and a secondary condensation catalyst. The primary condensation catalyst advantageously is a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the primary catalyst, should be a fixed alkali, for instance a carbonate, cyanide or hydroxide of an alkali metal (e g., sodium, potassium, lithium, etc.).

Another method of effecting reaction between the ingredients comprises first condensing the aralkylsulphonamide with the aldehyde, adding the resulting condensation product to a partial condensation product of an amidogen compound and an aldehyde body and then causing the reaction to proceed further. Or, I may condense or partially condense the aralkylsulphonamide with a mol excess of an aldehyde, add an amidogen compound to this condensation product and effect further reaction between the components. Still other ways may be employed in combining the components and in producing the unmodified and modified condensation products of this invention, as will be readily understood by those skilled in the art from my description of the invention.

In producing the condensation product of ingredients comprising an aralkylsulphonamide and an aldehyde, e. g., formaldehyde or other active methylene-containing body, the mol ratio of reactants may be considerably varied. Ordinarily, however, there is used at least one mol of the aldehyde for each mol of the aralkylsulphonamide. When this resinous product is mixed with other synthetic resins, e. g., aminoplasts, phenoplasts, etc., as a plasticizer for the latter, it generally constitutes a minor proportion of the mixed resin, say, from 1 to 20% by weight of the mixture. Good results usually are obtained when the resinous plasticizer constitutes from 2 to 10% by weight of the resin with which it is admixed. Phenol-aldehyde resins are examples of phenoplasts which thus may be plasticized. The following are examples of aminoplasts: urea-aldehyde resins, aminotriazine-aldehyde resins (e. g., melamine-formaldehyde resins), urea-aminotriazine-aldehyde resins, aminodiazine-aldehyde resins, protein-aldehyde resins (e. g., casein-formaldehyde resins), aniline-aldehyde resins, benzene disulphonamide-aldehyde resins, sulphanilamide-aldehyde resins, resinous condensation products of aldehydes such as formaldehyde with polyamides as, for instance, malonic diamide, maleic diamide, fumaric diamide, itaconic diamide, etc., also condensation products of active alkylol, specifically methylol, derivatives of a urea, e. g., dimethylol urea, or methylol derivatives of an aminotriazine, e. g., trimethylol melamine, with compounds such, for instance, as urea, thiourea, iminourea, substituted ureas, thioureas and iminoureas, aminotriazines, proteins, aniline, benzene disulphonamide, sulphanilamide, malonic diamide, maleic diamide, fumaric diamide, itaconic diamide, etc.

When the aralkylsulphonamide is intercondensed with an aldehyde and another organic compound capable of reacting with an aldehyde, the aralkylsulphonamide usually is present in a relatively small amount not exceeding substantially ¼ mol for each mol of the other compound which will react with the aldehyde. The aldehyde, e. g., formaldehyde or other active methylene-containing body, generally is employed in a molar amount at least equivalent to the molar amount of the sum of the aralkylsulphonamide plus the other organic compound capable of reacting with the aldehyde. Good results are obtained when from 1½ mols to 4 or 5 mols of the aldehyde are employed for each mol of the sum of the aralkylsulphonamide and the other compound reactable with the aldehyde that is present in the reaction mixture.

In producing these new condensation products the choice of the aldehydic reactant is dependent largely upon economic considerations and upon the particular properties desired in the finished product. I prefer to use as the aldehyde component formaldehyde or compounds engendering formaldehyde, e. g., paraformaldehyde, hexamethylene tetramine, etc., including aldehyde-addition products, for instance, methylol derivatives of organic compounds, e. g., methylol derivatives of ureas, thioureas and iminoureas, methylol derivatives of amidogen diazines, amidogen triazines, etc. For some applications I may use, for instance, acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Also, in certain cases I may use, for example, active alkylol derivatives higher than methylol in the homologous series. Mixtures of active methylene-containing bodies may be employed, e. g., mixtures of monomethylol urea and dimethylol urea, mixtures of dimethylol urea and formaldehyde, mixtures of dimethylol urea and trimethylol melamine, mixtures of trimethylol melamine and formaldehyde, mixtures of dimethylol urea, trimethylol melamine and formaldehyde, etc.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, acetamide, stearamide, acrylamide, benzamide, adipic diamide, phthalamide, etc.; amines such as ethylene diamine, aniline, phenylene diamine, etc.; phenols; aminophenols; ketones; nitriles, e. g., acrylonitrile, methacrylonitrile, succinonitrile, etc.

The modifying bodies also may take the form of high molecular weight bodies with or without resinous characteristics, for example, in addition to those previously mentioned, hydrolyzed wood products, formalized cellulose derivatives, lignin, proteins, phenol-aldehyde condensation products, furfural condensation products, modified or unmodified, saturated or unsaturated polyhydric alcohol-polybasic acid condensation products, water-soluble cellulose derivatives, natural gums and resins such as shellac, rosin, etc., polyvinyl compounds such as polyvinyl esters, e. g., polyvinyl acetate, polyvinyl butyrate, etc., polyvinyl acetals, specifically polyvinyl formal, etc.

Dyes, pigments, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a variety of shapes under heat and pressure, more particularly at temperatures of the order of 100° to 200° C., preferably from 120° to 180° C. Molding pressures may be varied considerably, but usually are within the range of 1,000 to 10,000 pounds per square inch, more particularly from 2,000 to 4,000 or 5,000 pounds per square inch.

From the foregoing description it will be seen that the present invention provides new and useful compositions of matter comprising the product of reaction of ingredients comprising essentially (1) an aldehyde, e. g., formaldehyde or other active methylene-containing body such as dimethylol urea, etc., and (2) an aryl-substituted aliphatic sulphonamide wherein the aliphatic chain is a straight-chain, saturated aliphatic chain and the sulphonamide grouping has at least one hydrogen atom attached directly to the nitrogen atom thereof, e. g., benzyl sulphonamide. The reaction mass also may contain other reactive ingredients, e. g., a phenol, a urea, an alcohol, an amidogentriazine, a nitrile, a protein, etc., or suitable mixtures thereof. If a phenol is employed it may be, for example, phenol itself, $C_6H_5OH$, or its homologues such as the ortho, meta and para cresols, the xylenols, etc.; higher alkyl phenols such as meta ethyl phenol, para tertiary butyl phenol, para tertiary amyl phenol, etc.; aryl phenols such as the ortho, meta and para phenyl phenols, the ortho, meta and para benzyl phenols, phenyl phenol, ethanes, para, para prime-(dihydroxy diphenyl) propanes, etc.; or mixtures of phenolic bodies reactable with an aldehyde, e. g., formaldehyde or other active methylene-containing body. The new intercondensation products in which the phenolic body is a substituted phenol containing three or more carbon atoms in the substituent grouping are soluble in oils, as for example drying and semi-drying fatty oils, and in such form, with or without further heat treatment of the oily solution of the resinous condensation product, may be used in the production of coating compositions such as varnishes, enamels, lacquers, etc. Numerous examples of substituted phenols yielding oil-soluble intercondensation products (in addition to those mentioned above that contain three or more carbon atoms in the substituent grouping) are given in various copending applications of mine, for example in copending application Serial No. 296,811, filed September 27, 1939, now Patent No. 2,263,290, issued November 18, 1941, and assigned to the same assignee as the present invention.

Examples of ureas which may be present in the reaction mass in addition to the aralkylsulphonamide and the aldehyde are urea itself, $NH_2CONH_2$, alkyl ureas and thioureas (e. g., methyl, ethyl, etc., ureas and thioureas), aryl ureas and thioureas (e. g. phenyl urea and thiourea, unsymmetrical diphenyl urea and thiourea, etc.), alkyl aryl ureas and thioureas (e. g., unsymmetrical methyl phenyl urea and thiourea, unsymmetrical ethyl phenyl urea and thiourea, etc.), hydroxy ureas and thioureas, ethanol ureas and thioureas, acetyl urea and thiourea, benzoyl urea and thiourea, allyl urea and thiourea, 2-chlorallyl urea and thiourea, di-(phenyl sulphonamide) ureas and thioureas, guanyl urea and thiourea, guanidine (iminourea), biguanide, aminoguanidine, dicyandiamide (cyano-iminourea), etc.

Instead of melamine, other amidogentriazines may be present in the reaction mass, e. g., ammeline, ammelide, formoguanamine, melam, melon, etc., additional examples being given in various copending applications of mine, for instance in copending application Serial No. 371,393, filed December 23, 1940, now Patent No. 2,328,424, issued Aug. 31, 1943, and Serial No. 404,661, filed July 30, 1941, now Patent No. 2,312,688, issued March 2, 1943, both of which applications are assigned to the same assignee as the present invention.

Particularly valuable compositions of the invention comprise the product of reaction of (1) a partial condensation product of ingredients comprising (a) urea, or melamine, or urea and melamine, (b) an aldehyde, e. g., formaldehyde or other active methylene-containing body such as dimethylol urea, and (c) an aryl-substituted-aliphatic sulphonamide wherein the aliphatic chain is a straight-chain, saturated aliphatic chain and the sulphonamide grouping has at least one hydrogen atom attached directly to the nitrogen atom thereof, preferably benzyl sulphonamide with (2) a curing reactant, e. g., chlorinated acetamides, chlorinated acetonitriles, aminoacetamide hydrochloride, aminoacetonitrile hydrochloride, ethylene diamine monohydrochloride, diethanol amine hydrochloride, nitroureas, chloracetyl ureas, glycine, chlorinated acetones, etc. I prefer to use a curing reactant comprising a chlorinated acetamide, specifically chloracetamide (monochloracetamide).

My invention also provides thermosetting (heat-hardenable) molding compositions comprising a filler, e. g., a cellulosic filler, and a heat-curable condensation product of this invention, e. g., a heat-hardenable (heat-curable) aminoplast modified with a condensation product of ingredients comprising essentially an aldehyde and an aralkylsulphonamide such as hereinbefore described, as well as molded articles of manufacture comprising the heat-set molding compositions. A more specific example is a heat-hardenable molding composition comprising a cellulosic filler and a heat-curable condensation product of ingredients comprising urea (or melamine or urea and melamine), formaldehyde (or dimethylol urea or formaldehyde and dimethylol urea), benzyl sulphonamide and chloracetamide. Products comprising the heat-hardened molding compositions are well cured throughout and show good plastic flow during molding.

The scope of this invention also includes method features for the production of the above-described condensation products. For instance, one specific method feature of the invention comprises effecting reaction between ingredients comprising essentially (1) an aldehyde, (2) a urea (e. g., $NH_2CONH_2$) or an aminotriazine (e. g., melamine) or both a urea and an aminotriazine (e. g., urea and melamine) and an aralkylsulphonamide such as above described, specifically benzyl sulphonamide, said reaction being carried out in the presence of a condensation catalyst comprising ammonia and a fixed alkali, adding a small amount of a chlorinated acetamide, specifically mono-chloracetamide, to the resulting partial condensation product, and causing the chlorinated acetamide to intercondense with the said partial condensation product.

The modified and unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the production of wire or baking enamels, for bonding or cementing together mica flakes to form a laminated mica article, in the manufacture of electrical resistors, etc. They also may be used as fire retardants and sizings, for instance in the treatment of cotton, linen and other cellulosic materials. Especially valuable products from the standpoint of high arc resistance and high resistance to heat and moisture are obtained when an aminotriazine, specifically melamine, constitutes one of the starting reactants.

What I claim as new and desire to secure by Letters Patent of the United States is:

1. A composition comprising the product of reaction of (1) a partial condensation product of ingredients comprising urea, formaldehyde and benzyl sulphonamide with (2) a curing reactant comprising a chlorinated acetamide.

2. A composition comprising the product of reaction of (1) a partial condensation product of ingredients comprising urea, melamine, formaldehyde and benzyl sulphonamide with (2) a small amount of chloracetamide.

3. A heat-hardenable molding composition comprising a cellulosic filler and a heat-curable condensation product of ingredients comprising urea, formaldehyde, benzyl sulphonamide and chloracetamide.

4. A product comprising the heat-hardened molding composition of claim 3.

5. The method which comprises effecting partial reaction between ingredients comprising urea, melamine, formaldehyde and benzyl sulphonamide in the presence of a condensation catalyst comprising ammonia and a fixed alkali, adding a small amount of a chlorinated acetamide to the resulting partial condensation product, and causing the chlorinated acetamide to intercondense with the said partial condensation product.

GAETANO F. D'ALELIO.